United States Patent [19]
Hebert

[11] Patent Number: 5,318,211
[45] Date of Patent: Jun. 7, 1994

[54] APPARATUS FOR MEDIA GUIDANCE IN AN IMAGING DEVICE

[75] Inventor: Thomas K. Hebert, Groveland, Mass.

[73] Assignee: Miles, Inc., Wilmington, Mass.

[21] Appl. No.: 930,290

[22] Filed: Aug. 17, 1992

[51] Int. Cl.⁵ .............................................. G03B 1/56
[52] U.S. Cl. ...................................... 226/91; 226/92; 226/196; 242/76
[58] Field of Search .......................... 226/91, 92, 196; 242/76

[56] References Cited

U.S. PATENT DOCUMENTS

| | | | |
|---|---|---|---|
| 3,817,437 | 6/1974 | Nagahiro et al. | 226/91 |
| 3,999,696 | 12/1976 | Reba et al. | 226/91 X |
| 4,059,211 | 11/1977 | Brizzolara | 226/91 X |
| 4,204,620 | 5/1980 | Wurfel | 226/92 X |
| 4,520,970 | 6/1985 | Rasmussen et al. | 226/92 X |
| 4,555,076 | 11/1985 | Uchiyama | 226/91 X |

Primary Examiner—Daniel P. Stodola
Assistant Examiner—Paul Bowen
Attorney, Agent, or Firm—Richard J. Birch

[57] ABSTRACT

A media guide for assisting in threading the head end of a rolled, radiation sensitive media through an imaging station in an imaging device. The media guide has a longitudinally extending arcuate input media guide and a parallel longitudinally extending arcuate output media guide with the open arcuate surfaces thereof facing in the same direction. A longitudinally extending imaging aperture slot is positioned between and parallel to the arcuate input and output media guides. The input side of the imaging aperture slot is located above the output side of the aperture to prevent the media from catching in the aperture slot.

6 Claims, 3 Drawing Sheets

APPARATUS FOR MEDIA GUIDANCE IN AN IMAGING DEVICE

BACKGROUND OF THE INVENTION

The present invention relates to imaging devices in general and, more particularly, to a media guide for assisting in the threading of rolled media through the imaging station of the imaging device.

Imaging devices utilizing a film supply cassette and a take up cassette are well known in the art. Such devices typically employ drive rolls to pull the media out from the supply cassette and through an imaging station at which the film is imaged and then to the take up cassette. Initially, the film must be pulled from the supply cassette and threaded through the imaging station until the film can be engaged by the drive rolls. The threading procedure can be awkward and difficult.

OBJECTS OF THE INVENTION

It is, accordingly, a general object of the invention to provide a media guide for imaging devices.

It is a specific object of the invention to provide a media guide to assist in threading rolled media through the imaging station of an imaging device.

It is another object of the invention to provide a media guide having an imaging aperture slot.

It is a feature of the media guide that debris from the media is effectively sealed from the optical portion of the imaging device.

It is another feature of the invention that the configuration of the guide prevents the media from entering the imaging aperture slot during the media threading operation.

BRIEF SUMMARY OF THE INVENTION

A media guide for threading rolled film and the like through the imaging station of an imaging device that employs two arcuate, longitudinally extending parallel media guides. An imaging aperture slot is positioned between and parallel to the arcuate input and output media guides.

BRIEF DESCRIPTION OF THE DRAWINGS

The object and features of the invention will best be understood from a detailed description of a preferred embodiment selected for purposes of illustration and shown in the accompanying drawings, in which.

DETAILED DESCRIPTION OF A PREFERRED EMBODIMENT

Figure 1:
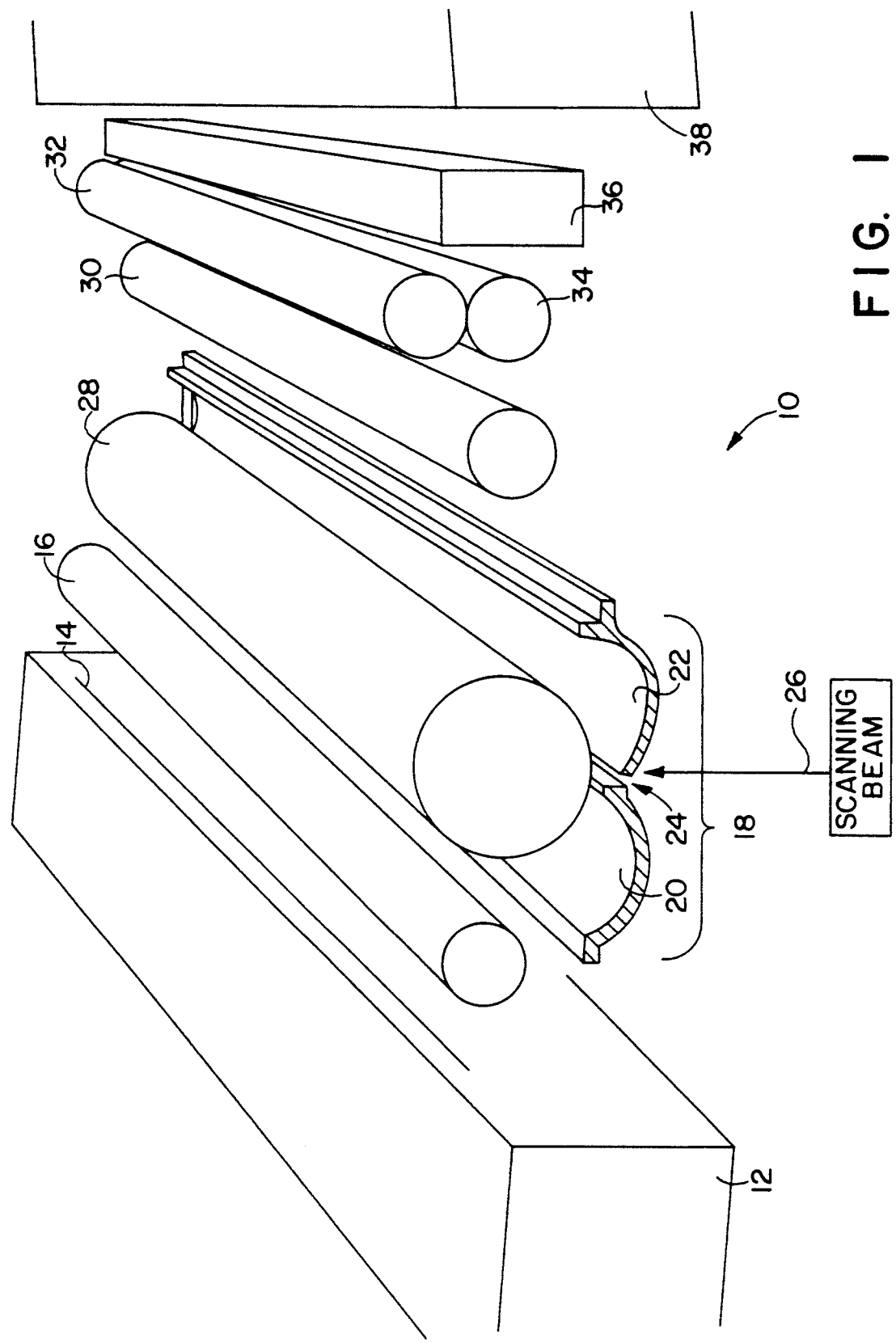
FIG. 1 is a diagrammatic view in perspective of an imaging device incorporating the media guide of the present invention.
Figure 6:
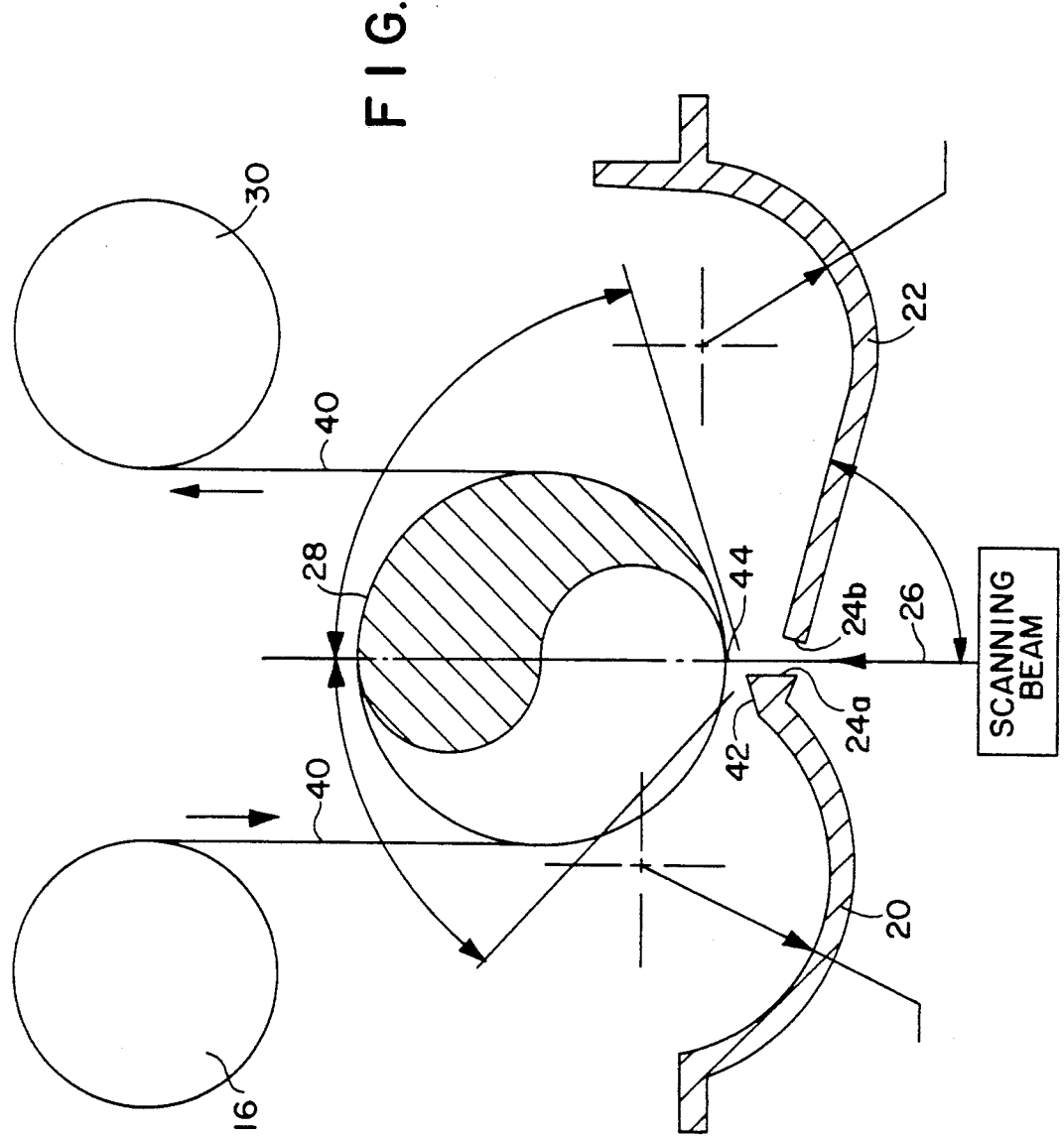

Turning now to the drawings, and particularly to FIG. 1 thereof, there is shown in diagrammatic form and perspective an imaging device indicated generally by the reference numeral 10. The imaging device contains a media supply cassette 12 having a cassette feed aperture 14 through which exits radiation sensitive media e.g., film (not shown). The film passes over an input tension roll 16 and through a media guide 18 having a longitudinally extending, arcuate input guide 20, a parallel longitudinally extending arcuate output media guide 22 and a longitudinally extending imaging aperture slot 24 that is parallel to the longitudinal axes of the input and output media guides, 20 and 22, respectively. In the operative position during imaging by a scanning beam 26, the film is in contact with capstan 28 (as shown in FIG. 6). Upon exiting from the capstan 28, the film passes over an output tensioning roll 30 and through drive rolls 32 and 34 to a cutter block 36 and then into the take up cassette 38.

Figure 2:
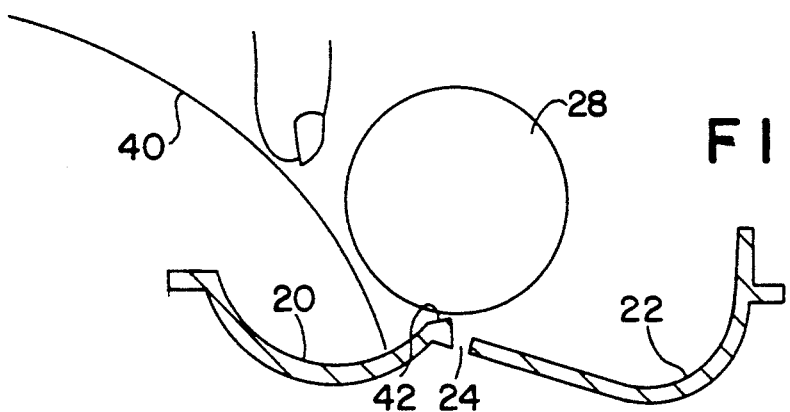
FIGS. 2 through 5 are views in side elevation and partial section illustration sequentially the media threading operation through the media guide; and, FIG. 6 is an enlarged view in side elevation and partial section showing the media in the imaging position.
Figure 3:
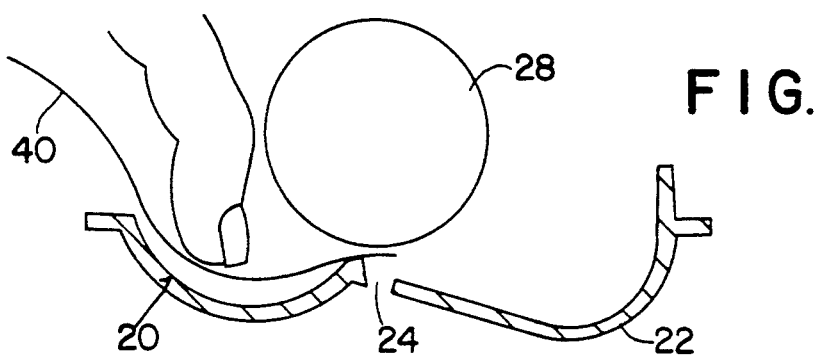
Figure 4:
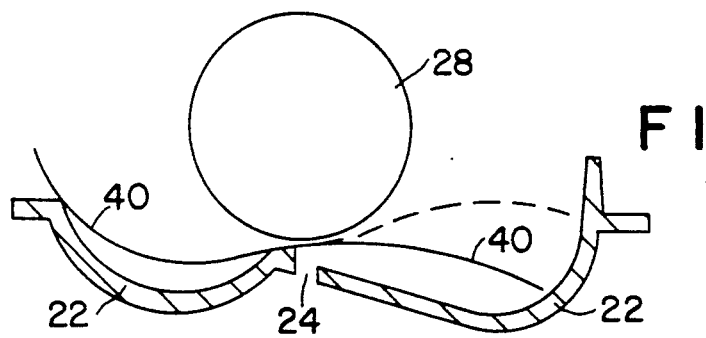
Figure 5:
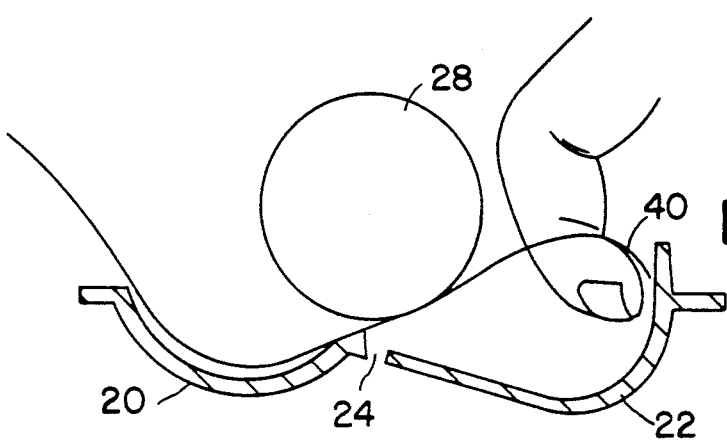

Referring now to the sequential illustrations of FIGS. 2 through 5, there is shown in side elevation and partial section the threading operation of a film 40. As shown in FIG. 2, the film 40 is pushed into the input media guide 20 and then pushed downwardly into the arc of the input guide 20 and over the imaging aperture slot 24 as depicted in FIG. 3. It can be seen from FIG. 3 that the film is ramped upwardly, as viewed in FIG. 3, by a ramp portion 42 (FIG. 2).

The imaging aperture slot 24 has an input side 24a and a output side 24b (FIG. 6) with the output side 24b located below the input side 24a. This arrangement prevents the film 40 from catching in the imaging aperture slot 24 as the film is pushed from left to right as viewed in FIGS. 3 and 4. Continuing in sequence, the film is then pushed to the right as viewed in FIG. 4 and encounters the arc of the output guide 22. Once the film has encountered the arcuate surface of the output guide 22 further pushing in the direction from left to right as viewed in FIG. 5, causes the film to buckle upwardly where it can be caught by a finger and pulled through and out of the media guide 18. Alternatively, the film can be pushed downwardly as viewed in FIG. 5 and then further pushing will cause the film to move upwardly beyond the upper surface of the output media guide as viewed in FIG. 5.

Referring now to FIG. 6, the structural components of the media guide 18 are shown in enlarged detail with the film 40 wrapped around capstan 28. The scanning beam 26 forms an image on film 40 at image station 44. It will be appreciated from an inspection of FIG. 6 that debris from media 40 will fall into the troughs formed by the arcuate input media guide 20 and the arcuate output media guide 22 rather than into the optical system of the imaging device.

Having described in detail a preferred embodiment of my invention, it will now be apparent to those with skill in the art that numerous modifications can be made therein without departing from the scope of the invention as defined in the following claims.

What I claim is:

1. A media guiding apparatus for use in an imaging device employing radiation sensitive media in roll form, said media guiding apparatus comprising:
   (a) a longitudinally extending, arcuate input media guide means for guiding the radiation sensitive media through an input arcuate path with the longitudinal axis of the input media guide means being normal to the direction of movement of the radiation sensitive media through said input arcuate path;
   (b) a longitudinally extending arcuate output media guide means for guiding the radiation sensitive media through an output arcuate path with the longitudinal axis of said output media guide means being normal to the direction of movement of the radiation sensitive media through said output arcuate path and parallel to the longitudinal axis of said input media guide means; and, (c) a longitudinally extending imaging aperture slot means for imaging therethrough onto the media positioned between said input and output media guide means with the longitudinal axis of the imaging aperture slot means being parallel to the longitudinal axes of said input and output media guide means.

2. The media guiding apparatus of claim 1 wherein the arcuate input and output media guide means have different length radii.

3. The media guiding apparatus of claim 2 wherein the length of the radius of the arcuate input media guide means is greater than the length of the radius of the arcuate output media guide means.

4. The media guiding apparatus of claim 1 wherein the center of curvature of the arcuate output media guide means is vertically lower than the center of curvature of the arcuate input media guide during use of the imaging device.

5. The media guiding apparatus of claim 1 wherein said arcuate input media guide includes means defining a longitudinally extending ramp for the media, said ramp means terminating at said imaging aperture slot means.

6. The media guiding apparatus of claim 1 wherein said imaging aperture slot means includes a first side wall on the arcuate input media guide means and a second side wall on the arcuate output media guide means and wherein said first side wall terminates at a vertically higher location than the second side wall terminates at.

* * * * *